United States Patent
Xu et al.

(10) Patent No.: US 7,974,331 B2
(45) Date of Patent: Jul. 5, 2011

(54) RAKE RECEIVER WITH INDIVIDUAL FINGER COMPENSATOR(S)

(75) Inventors: Luzhou Xu, Shanghai (CN); Dong Wang, Shanghai (CN)

(73) Assignee: ST-Ericsson SA, Geneva (CH)

( * ) Notice: Subject to any disclaimer, the term of this patent is extended or adjusted under 35 U.S.C. 154(b) by 310 days.

(21) Appl. No.: 10/500,548

(22) PCT Filed: Dec. 9, 2002

(86) PCT No.: PCT/IB02/05352
§ 371 (c)(1),
(2), (4) Date: Jul. 1, 2004

(87) PCT Pub. No.: WO03/058839
PCT Pub. Date: Jul. 17, 2003

(65) Prior Publication Data
US 2005/0078740 A1    Apr. 14, 2005

(30) Foreign Application Priority Data
Jan. 7, 2002    (EP) ..................................... 02075027

(51) Int. Cl.
*H04B 1/707*    (2011.01)
(52) U.S. Cl. ........ 375/148; 375/136; 375/141; 375/142; 375/144; 375/150; 375/316; 375/340; 375/343; 375/346; 375/347; 375/349; 375/350; 455/63.1; 455/114.2; 455/296; 455/501; 370/334; 370/335; 370/342
(58) Field of Classification Search .................. 375/148, 375/144, 347, 349, 136, 141, 142, 147, 150, 375/316, 340, 343, 346, 350; 370/334, 335, 370/342; 455/132, 296, 63.1, 114.2, 501
See application file for complete search history.

(56) References Cited

U.S. PATENT DOCUMENTS

| | | | | |
|---|---|---|---|---|
| 6,154,443 A * | 11/2000 | Huang et al. | .................. | 370/210 |
| 6,278,725 B1 * | 8/2001 | Rouphael et al. | ............. | 375/148 |
| 6,289,061 B1 * | 9/2001 | Kandala et al. | ............... | 375/344 |
| 6,292,519 B1 * | 9/2001 | Popovic | ........................ | 375/346 |
| 6,363,102 B1 * | 3/2002 | Ling et al. | ..................... | 375/147 |
| 6,373,882 B1 * | 4/2002 | Atarius et al. | ................ | 375/148 |
| 6,580,772 B2 * | 6/2003 | Pajukoski | .................... | 375/350 |
| 6,608,858 B1 * | 8/2003 | Sih et al. | ....................... | 375/147 |
| 6,888,878 B2 * | 5/2005 | Prysby et al. | ................. | 375/148 |
| 6,947,475 B2 * | 9/2005 | Sendonaris et al. | .......... | 375/148 |
| 2002/0015438 A1 * | 2/2002 | Ishizu et al. | ................... | 375/147 |
| 2004/0013169 A1 * | 1/2004 | Kanemoto et al. | ............ | 375/147 |

FOREIGN PATENT DOCUMENTS

EP        0989687 A2    3/2000

* cited by examiner

*Primary Examiner* — Leon Flores

(57) ABSTRACT

Rake receivers in code division multiple access (CDMA) telecommunication comprise fingers (1,2,3) with each finger processing signal components for a particular transmission path to be able to better synchronize with a RF signal received via different paths, and a combiner (4) for combining the results originating from said fingers, and a compensator in the form of a controlled oscillator in a feedback loop. By locating a finger compensator (20-25) in a finger, said finger can handle complex situations, like Doppler shifts under high-speed conditions. Preferably, most or all fingers each comprise such a finger compensator, in which case said feedback loop can be avoided. Such a finger compensator can be hardware, software or a mixture of both when comprising a filter (21) plus an amplitude normalizer (22) between two arithmetical modules (20,25) for multiplying an input symbol signal with a conjugated previous input symbol signal and an output symbol signal with a previous output symbol signal.

20 Claims, 2 Drawing Sheets

RAKE RECEIVER WITH INDIVIDUAL FINGER COMPENSATOR(S)

Figure 1:
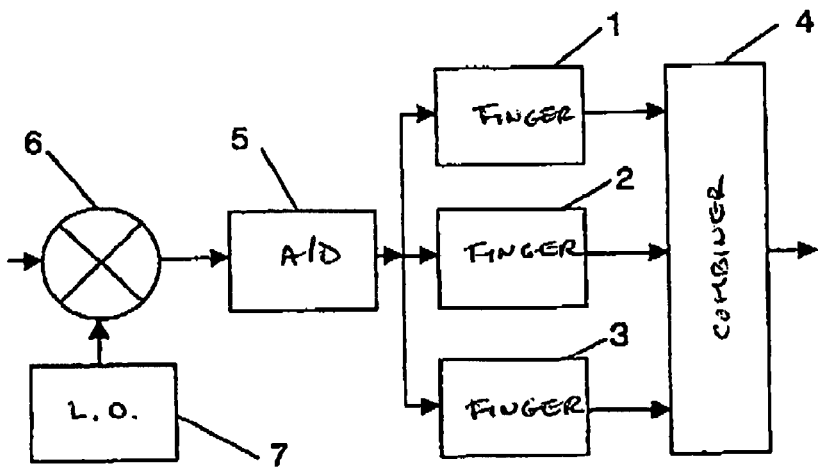

The invention relates to a rake receiver comprising at least two fingers, a combiner coupled to said fingers and a compensator.

The invention also relates to a finger for use in a rake receiver comprising at least two fingers, a combiner coupled to said fingers and a compensator, and to a system comprising at least one portable unit and at least one network unit for radio communication, with at least one unit comprising at least one rake receiver comprising at least two fingers, a combiner coupled to said fingers and a compensator, and to a portable unit comprising at least one rake receiver comprising at least two fingers, a combiner coupled to said fingers and a compensator, and to a network unit comprising at least one rake receiver comprising at least two fingers, a combiner coupled to said fingers and a compensator, and to a method for compensating signals in correspondence with at least part of a rake receiver and comprising at least two finger processing steps, a combining step and a compensating step, and to a processor program product (like for example a software product or a computer program product) for implementing at least part of a rake receiver and comprising at least two finger functions, a combining function and a compensating function to be run via a processor, and to a processor program product (like for example a software product or a computer program product) for implementing a finger and comprising a finger function to be run via a processor and for use in combination with at least part of a rake receiver at least partly implemented by at least two finger functions, a combining function and a compensating function to be run via said processor.

Rake receivers exploit multipath propagation (multipath propagation for example exists when a transmitted signal, before receival, is reflected via buildings etc.) by letting fingers (or rake arms) separately process multipath components of a transmitted signal and by then combining, for example by using a combiner, their energies. Thereto, more particularly, said fingers (or rake arms) track and despread the multipath components. Such a rake receiver is for example used in code division multiple access (CDMA) telecommunication systems or wideband code division multiple access (WCDMA) telecommunication systems, with said portable unit for example being a mobile phone and with said network unit for example being a base station or a switch or a router or a bridge or a server etc.

Such a rake receiver is known from EP 0 989 687 A2 which discloses a rake receiver comprising three fingers, a combiner, of which inputs are coupled to outputs of said fingers, and a compensator of which an input is coupled to an output of said combiner and of which an output is coupled via a controlled oscillator to an oscillator input of a mixer for example for converting intermediate frequency signals into baseband signals, which are supplied to said fingers. Each finger corresponds with a different transmission path and processes signal components for this particular transmission path (finally, to be able to better synchronize with a RF signal received via different transmission paths due to reflections etc.) which processed signal components, together with the processed signal components from the other fingers (corresponding with the other transmission paths), are all combined in said combiner, and then further processed etc. Due to being located between an output of the combiner and inputs of said fingers via said controlled oscillator and said mixer, this compensator makes a frequency-shift compensation for the entire rake receiver by controlling said controlled oscillator.

It is an object of the invention, inter alia, of providing a rake receiver which can handle more complex situations.

The rake receiver according to the invention is characterized in that at least one finger comprises a finger compensator.

By introducing said finger compensator in said finger, now, for example in addition to having one compensation for the entire rake receiver, an individual transmission path gets individual compensation via its individual finger comprising the individual finger compensator. This finger compensator for example compensates output signals of the finger's correlators. So, the finger compensator compensates symbol signals (for example mathematically).

The invention is based upon a basic idea, inter alia, of creating individual compensations for individual transmission paths.

The invention solves the problem, inter alia, of providing a rake receiver which can handle more complex situations, like for example Doppler frequency-shifts under high-speed conditions (like for example at 500 km/h), due to now not Oust) making a frequency-shift compensation per receiver, but for example in addition making a compensation per finger (in other words making a compensation per transmission path).

A first embodiment of the rake receiver according to the invention as defined in claim 2 is advantageous in that said finger compensator, comprising said filter like for example a FIR filter and said amplitude normalizer, is of a low complexity and highly stable.

A second embodiment of the rake receiver according to the invention as defined in claim 3 is advantageous in that this entire finger compensator can be implemented in hardware, software or a mixture of both.

A third embodiment of the rake receiver according to the invention as defined in claim 4 is advantageous in that said at least one finger, comprising the known pilot channel correlator and the known traffic channel correlator, with an output of said finger compensator being coupled to first inputs of the third and fourth arithmetical module like for example multipliers, of which second inputs are coupled to outputs of said correlators, allows a frequency-shift to be estimated by said finger compensator, after which said third and fourth arithmetical modules multiply a conjugated estimated frequency-shift with the output signals of both correlators for compensating the frequency-shift after both correlators.

A fourth embodiment of the rake receiver according to the invention as defined in claim 5 is advantageous in that said at least one finger, further comprising the known averaging unit, of which an input is coupled to an output of said third arithmetical module and of which an output is coupled to a first input of the fifth arithmetical module like for example a multiplier, of which a second input is coupled to an output of said fourth arithmetical module, can be implemented in hardware, software or a mixture of both.

A fifth embodiment of the rake receiver according to the invention as defined in claim 6 is advantageous in that most or preferably all fingers, each comprising said finger compensator, with all finger compensators together forming said compensator, allow most or preferably all transmission paths to be compensated individually.

A sixth embodiment of the rake receiver according to the invention as defined in claim 7 is advantageous in that said rake receiver, comprising the mixer for converting intermediate frequency signals into baseband signals, which mixer comprises an oscillator input coupled to a stable oscillator, no longer needs to be supplied by a controlled oscillator in a feedback loop.

Embodiments, of the finger according to the invention, of the system according to the invention, of the portable unit according to the invention, of the network unit according to the invention, of the method according to the invention, and of both processor program products according to the invention correspond with the embodiments of the rake receiver according to the invention.

These and other aspects of the invention will be apparent from and elucidated with reference to the embodiments(s) described hereinafter.

Figure 2:
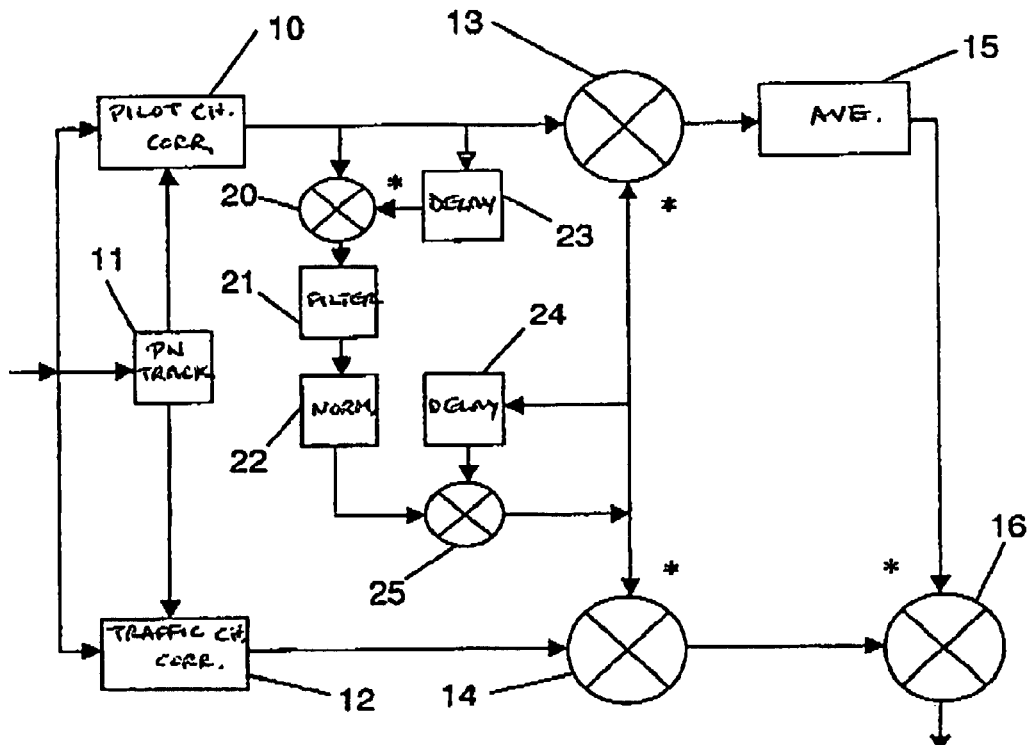
Figure 3:
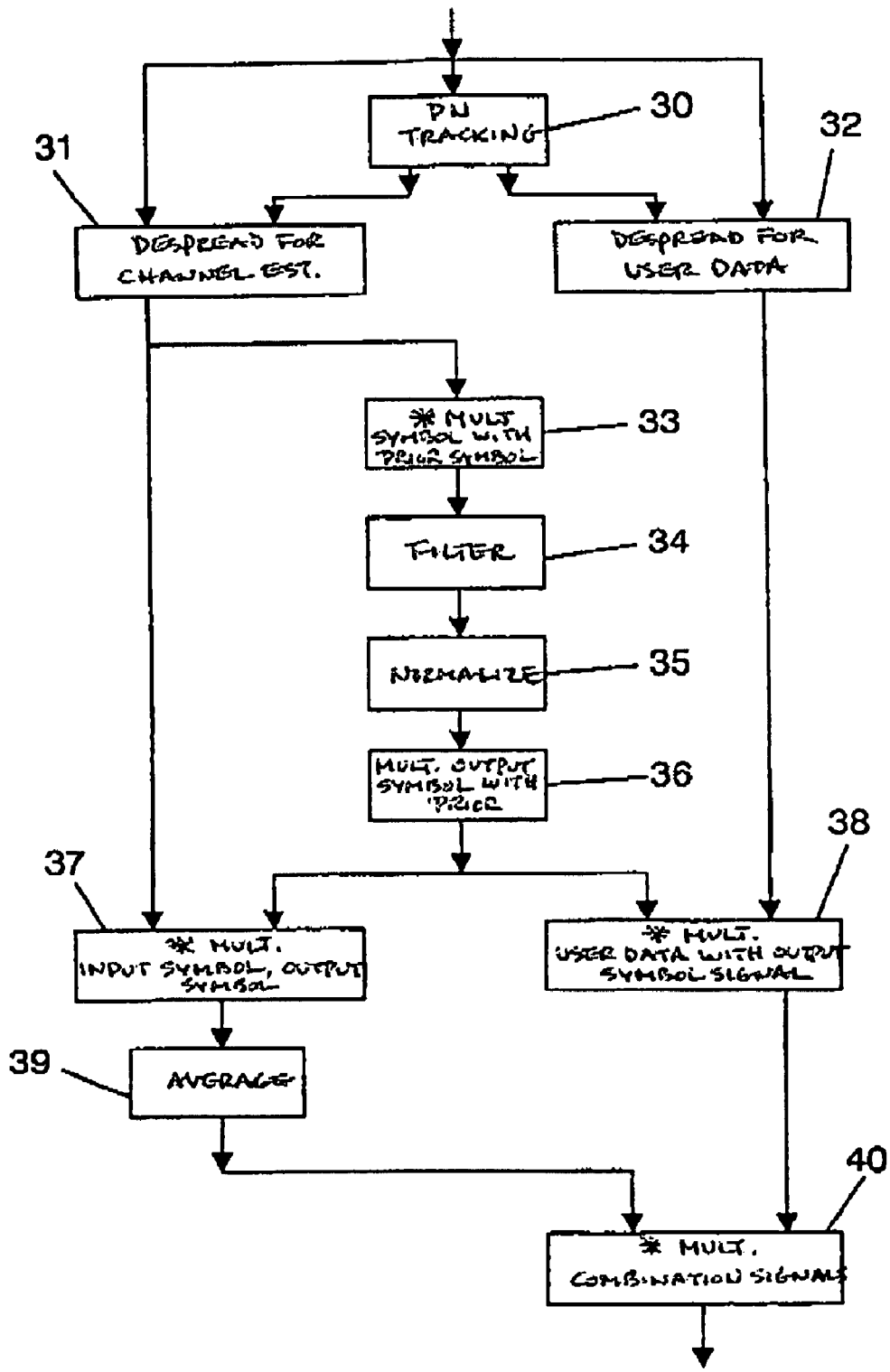

FIG. 1 illustrates in block diagram form a rake receiver according to the invention comprising fingers according to the invention, FIG. 2 illustrates in block diagram form a finger according to the invention comprising a finger compensator, and FIG. 3 illustrates a flow chart showing a method according to the invention and a processor program product according to the invention for implementing a finger.

FIG. 1 illustrates in block diagram form a rake receiver according to the invention comprising three fingers 1,2,3 according to the invention, of which the inputs are coupled to an output of an A/D converter 5 and of which the outputs are coupled to inputs of a combiner 4. An input of A/D converter 5 is coupled to an output of a mixer 6, of which a first input receives for example Intermediate Frequency (IF) signals and of which a second input is coupled to an output of a stable oscillator for down converting said IF signals to baseband signals like for example an In-phase (I) component and a Quadrature (Q) component which are oversampled and quantified into digital samples by said A/D converter (usually in parallel in which case A/D converter 5 comprises two sub-converters). These samples are supplied to all fingers 1,2,3, which despread and demodulate these samples into symbol signals.

FIG. 2 illustrates in block diagram form a finger 1,2,3 according to the invention comprising a finger compensator 20-25 comprising an arithmetical module 20 like for example a multiplier 20 of which a first input forms the input of said finger compensator 20-25 and of which a second input is coupled to an output of a delay introducer 23. An input of delay introducer 23 is coupled to said first input of said arithmetical module 20, of which an output is coupled to an input of a filter 21 like for example a FIR filter 21. An output of filter 21 is coupled to an input of amplitude normalizer 22, of which an output is coupled to a first input of an arithmetical module 25 like for example a multiplier 25. An output of multiplier 25 is coupled via a delay introducer 24 to a second input of arithmetical module 25 and forms an output of said finger compensator 20-25.

Said finger 1,2,3 according to the invention illustrated in FIG. 2 further comprises a known pilot channel correlator 10 (for despreading a pilot channel and generating an instantaneous phase and amplitude estimation) and a known traffic channel correlator 12 (for despreading a data channel) both controlled by a known PN tracker 11 (for estimating and adjusting a phase offset between a received signal and locally generated spreading codes, with PN meaning Pseudo Noise Code and with PN trackers as well as possible additional PN code generators, multipliers and integrators being known technologies). Inputs of said correlators 10,12 and PN tracker 11 form the input of said finger 1,2,3. An output of correlator 10 is coupled to said input of finger compensator 20-25 and to a first input of an arithmetical module 13 like for example a multiplier 13, of which a second input is coupled to said output of finger compensator 20-25 and of which an output is coupled to an input of a known averaging unit 15, like for example Weight Multiple Symbol Average (WMSA) module. An output of correlator 12 is coupled to a first input of an arithmetical module 14 like for example a multiplier 14, of which a second input is coupled to said output of finger compensator 20-25 and of which an output is coupled to a first input of an arithmetical module 16, of which a second input is coupled to an output of averaging unit 15. An output of arithmetical module 16 forms an output of said finger 1,2,3.

For example in code division multiple access (CDMA) telecommunication systems or wideband code division multiple access (WCDMA) telecommunication systems, RF signals are exchanged between portable units like for example mobile phones and network unit like for example base stations or switches or routers or bridges or servers etc. These units comprise a rake receiver for dealing with multipath receptions (in other words, said RF signals, for example due to reflections, are received via different paths, which are individually processed by said fingers, after which the results are combined to be able to better synchronize with said RF signals). According to prior art, a rake receiver comprises a feedback loop including a controlled oscillator (a compensator) for compensating fluctuations in frequencies (Automatic Frequency Control or AFC). An input of this compensator is thereto either coupled to a further output of each finger or to an output of said combiner. However, such an AFC loop cannot handle Doppler frequency-shifts under high-speed conditions (like for example at 500 km/h), due to different transmission paths generally requiring different compensations.

The invention is based upon the insight, inter alia, that AFC loops cannot handle Doppler frequency-shifts under high-speed conditions, due to different transmission paths generally requiring different compensations, and is based upon the basic idea, inter alia, of creating individual compensations for individual transmission paths.

Thereto, as illustrated in FIG. 2, one or more of said fingers 1,2,3 according to the invention are each provided with finger compensator 20-25 which receives an input symbol signal from correlator 10, which input symbol signal via arithmetical module 20 and delay introducer 23 is multiplied (conjugatedly) with a conjugated previous input symbol signal, resulting in a combined signal which is filtered via filter 21, after which the amplitude is normalized via amplitude normalizer 22. The resulting signal is an output symbol signal which via arithmetical module 25 and delay introducer 24 is multiplied with a previous output symbol signal. Said combined output symbol signal is supplied to arithmetical modules 13 and 14 respectively to be multiplied (conjugatedly) with the conjugated output signals of correlators 10 and 12, after which the output signal of arithmetical module 14 is multiplied (conjugatedly) by arithmetical module 16 with a conjugated output signal of arithmetical module 13 after this output signal of arithmetical module 13 has been processed by averaging unit 15. Either said arithmetical modules 13, 14, 16 and 20 also take care of conjugating those signals which need to be conjugated or further modules not shown conjugate these signals, with said conjugating of signals being a known technology.

As a result, for example by individualizing filter 21 and/or amplitude normalizer 22, the finger compensator 20-25 allows each finger now being able to deal with more complex situations, like for example Doppler frequency-shifts under high-speed conditions. Further, the entire finger including the finger compensator can be made in software, which is very flexible, or in hardware, which is very fast, or in a mixture of both. So, each block shown in FIGS. 1 and 2, can be 100% hardware, 100% software or a mixture of both. Each block shown in FIGS. 1 and 2 can be integrated with each other block shown in FIGS. 1 and 2.

In the flow chart illustrated in FIG. 3 and showing a method according to the invention and a processor program product according to the invention for implementing a finger, the following blocks have the following meaning:

Block 30: PN tracking the phase between a received signal and local PN codes;

Block 31: Despreading samples with a local PN code for estimating channel parameters, the result is an input symbol signal;

Block 32: Despreading samples with a local PN code for generating user data;

Block 33: Multiply (conjugatedly) said input symbol signal with a conjugated previous input symbol signal;

Block 34: Filter this multiplied input symbol signal;

Block 35: Normalize an amplitude of this filtered multiplied input symbol signal, the result is an output symbol signal;

Block 36: Multiply said output symbol signal with a previous output symbol signal;

Block 37: Multiply (conjugatedly) said input symbol signal with a conjugated multiplied output symbol signal, the result is a first combination signal;

Block 38: Multiply (conjugatedly) said user data with said conjugated multiplied output symbol signal, the result is a second combination signal;

Block 39: Calculate an average of said first combination signal;

Block 40: Multiply (conjugatedly) a conjugated average of said first combination signal with said second combination signal.

Each one of said blocks 30-40 corresponds with a (sub)step of a method and/or with a (sub)function of a processor program product, with further (sub)steps and/or (sub)functions not to be excluded, as stated below. The method according to the invention and the processor program product according to the invention for implementing a finger function as follows.

The received signal, when ignoring Multiple Access Interference (MAI) and Intersymbol Interference (ISI), at the inputs of blocks 30, 31 and 32 can be written as $$r(t) = \exp(j \cdot \Delta\omega \cdot t) \cdot \{\Sigma h(n) \cdot C_{pilot}[t-nT_s] + \sigma a(k) \cdot h(k) \cdot C_{traffic}[t-nT_s] + m(t)\},$$

with r(t) being the received complex signal, n being a symbol number, h(n) being a wireless propagation parameter (assumed to be static in one symbol time), $C_{pilot}(t)$ being a spreading signal of a pilot channel including a PN code and a chip waveform, $C_{traffic}(t)$ being a spreading signal of a traffic channel, a(n) being a symbol signal, $\Delta\omega$ being a carrier frequency offset, m(t) being noise, and $T_s$ being a symbol period. Ignoring the interference from traffic signals and noise m(t), at the output of block 31, the pilot correlator's output signal can be written as $$P(n)(\Delta\omega) = INT[nT_s \to (n+1)T_s] \text{ of } r(t) \cdot C^*_{pilot}[t-nT_s]dt$$
$$= INT[nT_s \to (n+1)T_s] \text{ of } \exp(j \cdot \Delta\omega \cdot t) \cdot h(n) \cdot$$
$$C_{pilot}[t-nT_s] \cdot C^*_{pilot}[t-nT_s]dt$$
$$= h(n)\exp[j \cdot \Delta\omega \cdot (n \cdot T_s + T_s/2)] \cdot [2 \cdot \sin(\Delta\omega \cdot T_s/2)/\Delta\omega],$$

with 'INT[$nT_s \to (n+1)T_s$] of' being the integral from $nT_s$ to $(n+1)T_s$ of etc. When there is no carrier frequency offset, $\Delta\omega = 0$, a perfect wireless propagation parameter can be written as $$P(n)(0) = h(n) \cdot T_s.$$

Then the influence of $\Delta\omega$ to the correlator can be written as $$F(\Delta\omega) = P(n)(\Delta\omega)/P(n)(0) = \exp[j \cdot \Delta\omega \cdot (n \cdot T_s + T_s/2)] \cdot [2 \cdot \sin(\Delta\omega \cdot T_s/2)/(T_s \cdot \Delta\omega)].$$

Obviously, there are two influences of the carrier frequency offset ($\Delta\omega$), namely an amplitude fading $[2 \cdot \sin(\Delta\omega \cdot T_s/2)/(T_s \cdot \Delta\omega)]$ and a phase shift comprising a variable (n-dependent) phase shift $\Delta\omega \cdot n \cdot T_s$ and a fixed phase shift $\Delta\omega \cdot T_s/2$. The amplitude fading is very small and can be tolerated. At the output of block 33, when ignoring amplitude fading and assuming that the wireless propagation parameter shows little variation in one symbol period, in other words h(n)=h(n−1), the signal can be written as $$P(n)(\Delta\omega) \cdot P^*(n-1)(\Delta\omega) = |h(n)|^2 \cdot \exp[j \cdot \Delta\omega \cdot T_s].$$

After FIR filtering and amplitude normalizing, at the output of block 35, the phase shift estimation can be written as $$S(n) = \exp[j \cdot \Delta\omega \cdot T_s].$$

At the output of block 36, a compensation signal can be written as $$\Phi(n) = \Phi(n-1) \cdot S(n) \cdot \exp[j \cdot \{n \cdot \Delta\omega \cdot T_s + \Phi(0)\}],$$

with $\Phi(0)$ being a fixed initial phase. Then, the pilot symbol signal after compensation, when ignoring amplitude fading, can be written as $$P'(n) = P(n) \cdot \Phi^*(n) = h(n) \cdot \exp[j \cdot \{\Delta\omega \cdot T_s/2 - \Phi(0)\}].$$

Similarly, the traffic symbol signal after compensation can be written as $$Q'(n) = Q(n) \cdot \Phi^*(n) = a(n) \cdot h(n) \cdot \exp[j \cdot \{\Delta\omega \cdot T_s/2 - \Phi(0)\}].$$

Both equations just show a fixed phase $\{\Delta\omega \cdot T_s/2 - \Phi(0)\}$ which has no effect and is eliminated by block 39, resulting in the influence of the carrier frequency offset being reduced.

Each one of the equations and/or formulaes states above and each part of the equations and/or formulaes states above could be considered to be a further (sub)step of a method according to the invention and/or to be a further (sub)function of a processor program product according to the invention. Said finger compensator, said finger according to the invention as well as at least most parts of said rake receiver according to the invention can now be implemented in the form of software via for example a digital signal processor, which is very flexible and further advantageous due to being written only once for millions of units. But also when implemented in the form of hardware, the invention still is very advantageous due to being very stable and allowing compensators in feedback loops to be avoided.

The invention claimed is:

1. Rake receiver for receiving information symbols, comprising at least two fingers and a combiner coupled to said fingers, wherein each of the at least two fingers comprises a finger compensator that compensates for frequency shift at the symbol level, wherein said finger compensator comprises:
   a filter and an amplitude normalizes coupled serially configured to receive an input symbol signal and configured to generate an output symbol signal; and
   a first arithmetical module configured to multiply said input symbol signal with a conjugated previous input symbol signal and a second arithmetical module configured to multiply said output symbol signal with a previous output symbol signal,
   wherein at least one finger comprises:
   a pilot channel correlator and a traffic channel correlator, with an output of said finger compensator being coupled to first inputs of a third and fourth arithmetical module, of which second inputs are coupled to outputs of said correlators; and an averaging unit, of which an input is coupled to an output of said third arithmetical module and of which an output is coupled to a first input of a fifth arithmetical module, of which a second input is coupled to an output of said fourth arithmetical module.

2. Rake Receiver according to claim 1, wherein all fingers each comprise a finger compensator, with all finger compensators together forming said compensator.

3. Rake receiver according to claim 2, wherein said rake receiver comprises a mixer configured to convert intermediate frequency signals into baseband signals, which mixer comprises an oscillator input coupled to a stable oscillator.

4. The Rake receiver according to claim 1, wherein said at least one finger further comprises a plurality of delay paths.

5. A system comprising at least one portable unit and at least one network unit capable of radio communication, with at least one unit comprising at least one rake receiver configured to receive information symbols, the at least one rake receiver comprising at least two fingers, and a combiner coupled to said fingers, wherein the at least two fingers each comprises a first arithmetical module configured to multiply an input symbol signal with a conjugated previous input symbol signal and a finger compensator that compensates for frequency shift at the symbol level, wherein the finger compensator is coupled to inputs of at least two arithmetical modules in a first set of arithmetical modules and at least one finger comprises an averaging unit coupled between at least two arithmetical modules in a second set of arithmetical modules, and wherein at least one arithmetical module is common to the first and second sets of arithmetical modules.

6. The system according to claim 5, wherein said finger compensator comprises a filter and an amplitude normalizer coupled serially configured to receive the input symbol signal and configured to generate an output symbol signal.

7. The system according to claim 6, wherein said finger compensator further comprises a second arithmetical module configured to multiply said output symbol signal with a previous output symbol signal.

8. The system according to claim 7, wherein at least one finger comprises a pilot channel correlator and a traffic channel correlator, with an output of said finger compensator being coupled to first inputs of a third and fourth arithmetical module, of which second inputs are coupled to outputs of said correlators.

9. The system according to claim 8, wherein said at least one finger comprises said averaging unit, of which an input is coupled to an output of said third arithmetical module and of which an output is coupled to a first input of a fifth arithmetical module, of which a second input is coupled to an output of said fourth arithmetical module.

10. The system according to claim 5, wherein all fingers each comprise a finger compensator, with all finger compensators together forming said compensator.

11. The system according to claim 10, wherein said rake receiver comprises a mixer configured to convert intermediate frequency signals into baseband signals, which mixer comprises an oscillator input coupled to a stable oscillator.

12. The system according to claim 5, wherein said finger compensator further comprises a plurality of delay paths.

13. Portable unit comprising at least one rake receiver configured to receive information symbols, the at least one rake receiver comprising at least two fingers and a combiner coupled to said fingers, wherein the at least two fingers each comprises a pilot channel correlator, a traffic channel correlator, and a finger compensator that compensates for frequency shift at the symbol level, wherein the finger compensator is coupled to inputs of at least two arithmetical modules in a first set of arithmetical modules and at least one finger comprises an averaging unit coupled between at least two arithmetical modules in a second set of arithmetical modules, and wherein at least one arithmetical module is common to the first and second sets of arithmetical modules.

14. The unit according to claim 13, wherein said finger compensator comprises a filter and an amplitude normalizer coupled serially configured to receive an input symbol signal and configured to generate an output symbol signal.

15. The unit according to claim 14, wherein said finger compensator further comprises a first arithmetical module configured to multiply said input symbol signal with a conjugated previous input symbol signal and a second arithmetical module configured to multiply said output symbol signal with a previous output symbol signal.

16. The unit according to claim 15, wherein with an output of said finger compensator being coupled to first inputs of a third and fourth arithmetical module, of which second inputs are coupled to outputs of said correlators.

17. The unit according to claim 16, wherein said at least one finger comprises said averaging unit, of which an input is coupled to an output of said third arithmetical module and of which an output is coupled to a first input of a fifth arithmetical module, of which a second input is coupled to an output of said fourth arithmetical module.

18. The unit according to claim 13, wherein all fingers each comprise a finger compensator, with all finger compensators together forming said compensator.

19. The unit according to claim 18, wherein said rake receiver comprises a mixer configured to convert intermediate frequency signals into baseband signals, which mixer comprises an oscillator input coupled to a stable oscillator.

20. Network unit comprising at least one rake receiver configured to receive information symbols, the at least one rake receiver comprising at least two fingers and a combiner coupled to said fingers, wherein the at least two fingers each comprises a first arithmetical module configured to multiply an input symbol signal with a conjugated previous input symbol signal and a finger compensator that compensates for frequency shift at the symbol level, wherein the finger compensator is coupled to inputs of at least two arithmetical modules in a first set of arithmetical modules and at least one finger comprises an averaging unit coupled between at least two arithmetical modules in a second set of arithmetical modules, and wherein at least one arithmetical module is common to the first and second sets of arithmetical modules.

* * * * *

UNITED STATES PATENT AND TRADEMARK OFFICE
CERTIFICATE OF CORRECTION

PATENT NO. : 7,974,331 B2  
APPLICATION NO. : 10/500548  
DATED : July 5, 2011  
INVENTOR(S) : Luzhou Xu and Dong Wang Page 1 of 1

It is certified that error appears in the above-identified patent and that said Letters Patent is hereby corrected as shown below:

Column 2, line 19, delete "Oust)" and insert -- (just) --.

Signed and Sealed this  
Twenty-seventh Day of September, 2011

David J. Kappos  
*Director of the United States Patent and Trademark Office*